US012627241B2

(12) United States Patent
Hirai

(10) Patent No.: US 12,627,241 B2
(45) Date of Patent: May 12, 2026

(54) SEMICONDUCTOR DEVICE HAVING SWITCHING ELEMENTS WITH TWO DIFFERENT CURRENT CAPACITIES

(71) Applicant: Mitsubishi Electric Corporation, Tokyo (JP)

(72) Inventor: Toshinari Hirai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 273 days.

(21) Appl. No.: 18/465,577

(22) Filed: Sep. 12, 2023

(65) Prior Publication Data

US 2024/0106341 A1    Mar. 28, 2024

(30) Foreign Application Priority Data

Sep. 22, 2022    (JP) ................................. 2022-151197

(51) Int. Cl.
 *H02M 7/00* (2006.01)
 *H02M 1/00* (2006.01)
(52) U.S. Cl.
 CPC ........... *H02M 7/003* (2013.01); *H02M 1/008* (2021.05)
(58) Field of Classification Search
 CPC .............................. H02M 7/003; H02M 1/008
 USPC .......................................................... 363/13
 See application file for complete search history.

(56) References Cited

U.S. PATENT DOCUMENTS

| | | | | |
|---|---|---|---|---|
| 10,874,037 B1 * | 12/2020 | Gupta | .................... | B60K 6/387 |
| 2008/0049477 A1 * | 2/2008 | Fujino | ................... | H02M 7/003 |
| | | | | 323/272 |
| 2010/0117570 A1 * | 5/2010 | Nishimori | ............. | H02M 7/003 |
| | | | | 318/400.3 |
| 2013/0207256 A1 * | 8/2013 | Uno | ...................... | H02M 3/155 |
| | | | | 438/106 |
| 2019/0315388 A1 | 10/2019 | Ohashi | | |

FOREIGN PATENT DOCUMENTS

| | | | | |
|---|---|---|---|---|
| DE | 11 2017 004 805 T5 | 8/2019 | | |
| GB | 2614045 A * | 6/2023 | ......... | H05K 7/20254 |
| JP | 2018-107893 A | 7/2018 | | |
| JP | 2018-143057 A | 9/2018 | | |

OTHER PUBLICATIONS

"Notice of Reasons for Refusal" Office Action issued in JP 2022-151197; mailed by the Japanese Patent Office on May 7, 2025.
Office Action issued in DE 10 2023 124 661.5; mailed by the German Patent and Trademark Office on Dec. 30, 2024.

* cited by examiner

*Primary Examiner* — Yemane Mehari
(74) *Attorney, Agent, or Firm* — Studebaker Brackett PLLC

(57)    ABSTRACT

In a semiconductor device, a plurality of first switching element chips and a plurality of first diode chips constituting a first inverter circuit, and a plurality of second switching element chips and a plurality of second diode chips constituting a second inverter circuit are mounted on a printed wiring board incorporated into a package. At this point, a current capacity of each of the plurality of second switching element chips is greater than a current capacity of each of the plurality of first switching element chips, and a current capacity of each of the plurality of second diode chips is greater than a current capacity of each of the plurality of first diode chips.

5 Claims, 6 Drawing Sheets

SEMICONDUCTOR DEVICE HAVING SWITCHING ELEMENTS WITH TWO DIFFERENT CURRENT CAPACITIES

BACKGROUND OF THE INVENTION

Field of the Invention

The present disclosure relates to a semiconductor device.

Description of the Related Art

Japanese Patent Laying-Open No. 2018-107893 discloses a configuration in which a plurality of power conversion circuits is incorporated into a power control unit (PCU) mounted on a vehicle. Specifically, a motor driving inverter, a generator inverter, and a step-up and -down converter are incorporated into the PCU.

The motor driving inverter has a DC input and output terminal and an AC input and output terminal. The motor driving inverter converts DC power input from the step-up and -down converter to the DC input and output terminal into AC power, and outputs the converted AC power from the AC input and output terminal to a motor. The generator inverter has an AC input terminal and a DC output terminal. The generator inverter converts generated power (AC power) input from a generator to the AC input terminal into DC power, and outputs the converted DC power from the DC output terminal to the step-up and -down converter. The step-up and -down converter has a first input and output terminal and a second input and output terminal. The set-up and -down converter boosts DC power of a first voltage input from an external DC power supply to the first input and output terminal to a second voltage (>first voltage), and outputs the boosted voltage from the second input and output terminal to a power generating inverter and a motor driving inverter.

Among these power conversion circuits, the motor driving inverter uses a single transistor chip and a single diode chip because a large current flows through a diode for a relatively long time during regenerative brake. On the other hand, a composite semiconductor chip in which a diode is incorporated into a transistor is used for the generator inverter and the step-up and -down converter. With such a configuration, optimization is achieved in terms of cost, cooling efficiency, size, and the like.

SUMMARY OF THE INVENTION

Unlike the configuration described in Japanese Patent Laying-Open No. 2018-107893, sometimes a plurality of motor driving inverters are used in the same device. For example, a motor that drives a compressor and a motor that drives an air-cooling fan for a heat exchanger are used for an air conditioner. In this case, inverter circuits dedicated to the respective motors are required because the respective motors have greatly different rated outputs.

However, a semiconductor device in which the plurality of motor driving inverters are incorporated into one package has not been developed so far. A semiconductor device into which the inverter circuit driving the motor for the compressor is incorporated and a semiconductor device into which the inverter circuit driving the motor for the air cooling fan is incorporated are required to be separately prepared in the case of the air conditioner described above. For this reason, it cannot be said that optimization has been achieved in terms of cost, cooling efficiency, size, and the like. For example, a cooler for each of a plurality of semiconductor devices is required to be provided.

The present disclosure has been made in view of the above problems, and an object of the present disclosure is to provide a semiconductor device capable of driving two types of motors having different rated outputs and capable of being optimized in terms of the cooling efficiency and the miniaturization.

A semiconductor device according to one embodiment includes a package, a printed wiring board incorporated into the package, a plurality of first switching element chips, a plurality of first diode chips, a plurality of second switching element chips, and a plurality of second diode chips. The plurality of first switching element chips are mounted on the printed wiring board and constitute a first inverter circuit. The plurality of first diode chips are mounted on the printed wiring board, individually correspond to the plurality of first switching element chips. Each of the plurality of the first diode chips is electrically connected in anti-parallel to a corresponding one of the plurality of first switching element chips. The plurality of second switching element chips are mounted on the printed wiring board and constitute a second inverter circuit. The plurality of second diode chips are mounted on the printed wiring board, individually correspond to the plurality of second switching element chips. Each of the plurality of second diode chips is electrically connected in anti-parallel to a corresponding one of the plurality of second switching element chips. A current capacity of each of the plurality of second switching element chips is greater than a current capacity of each of the plurality of first switching element chips, and a current capacity of each of the plurality of second diode chips is greater than a current capacity of each of the plurality of first diode chips.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
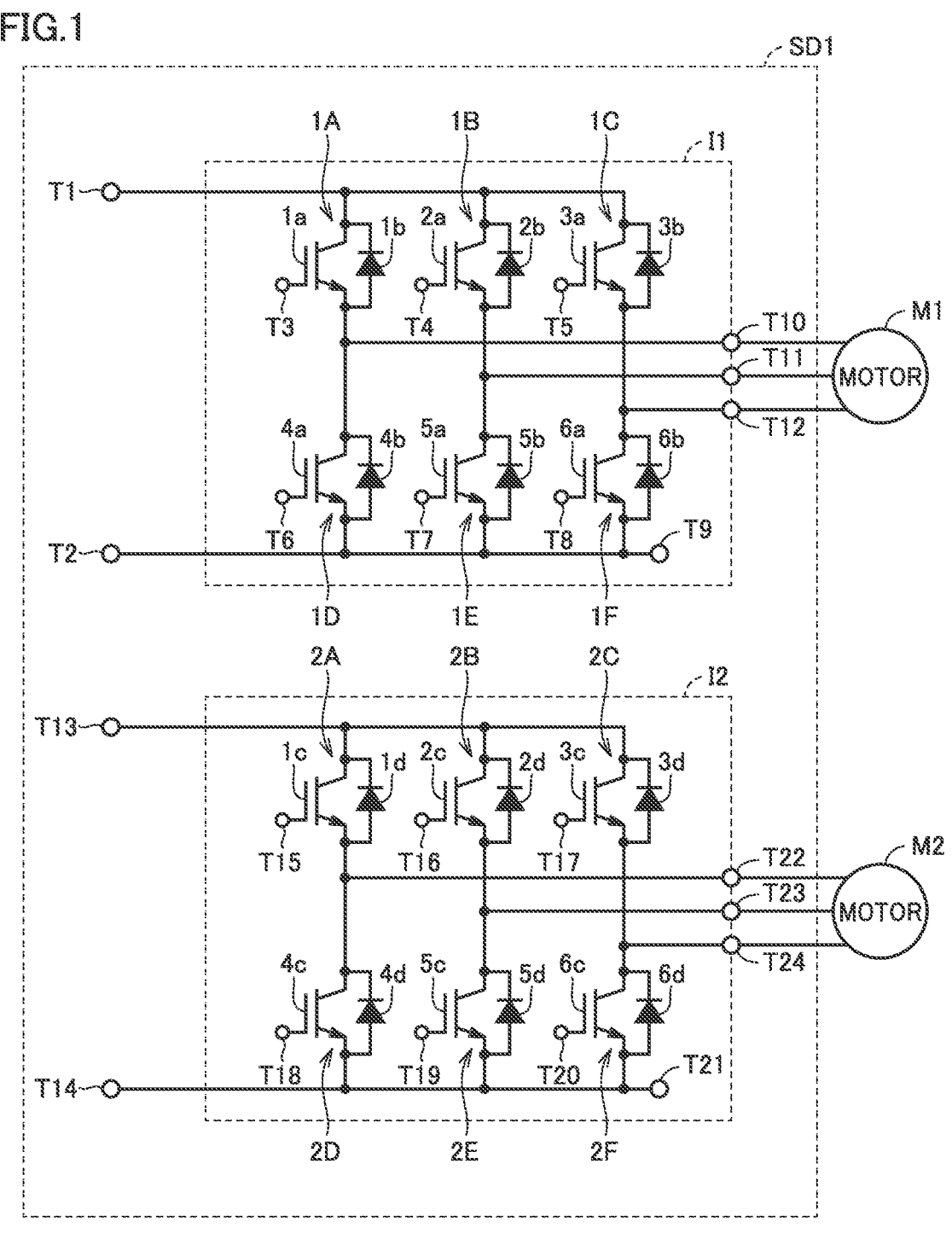
FIG. 1 is a circuit diagram illustrating a semiconductor device according to a first embodiment.

Hereinafter, each embodiment will be described in detail with reference to the drawings. The same or corresponding components will be denoted by the same or similar reference characters, and the description thereof will not be repeated.

First Embodiment (Circuit Configuration of Semiconductor Device SD1)

FIG. 1 is a circuit diagram illustrating a semiconductor device SD1 according to a first embodiment. With reference to FIG. 1, semiconductor device SD1 includes a first inverter circuit I1 that drives a first motor M1 and a second inverter circuit I2 that drives a second motor M2.

In the following description, sometimes first motor M1, second motor M2, first inverter circuit I1, and second inverter circuit I2 are simply referred to as a motor M1, a motor M2, an inverter circuit I1, and an inverter circuit I2. In the case of FIG. 1, motors M1, M2 are three-phase AC motors.

As illustrated in FIG. 1, first inverter circuit I1 includes semiconductor switching elements 1a to 6a, diodes 1b to 6b individually corresponding to semiconductor switching elements 1a to 6a, a high potential-side DC input terminal T1, a low potential-side DC input terminal T2, respective control terminals T3 to T8 of semiconductor switching elements 1a to 6a, an emitter terminal T9, and AC output terminals T10 to T12.

Semiconductor switching element 1a is connected between high potential-side DC input terminal T1 and A-phase AC output terminal T10. Diode 1b is connected in anti-parallel (that is, in a reverse bias direction and in parallel) to corresponding semiconductor switching element 1a. An A-phase upper arm 1A includes semiconductor switching element 1a and diode 1b.

Semiconductor switching element 2a is connected between high potential-side DC input terminal T1 and B-phase AC output terminal T11. Diode 2b is connected in anti-parallel to corresponding semiconductor switching element 2a. A B-phase upper arm 1B includes semiconductor switching element 2a and diode 2b.

Semiconductor switching element 3a is connected between high potential-side DC input terminal T1 and C-phase AC output terminal T12. Diode 3b is connected in anti-parallel to corresponding semiconductor switching element 3a. A C-phase upper arm 1C includes semiconductor switching element 3a and diode 3b.

Semiconductor switching element 4a is connected between low potential-side DC input terminal T2 and A-phase AC output terminal T10. Diode 4b is connected in anti-parallel to corresponding semiconductor switching element 4a. An A-phase lower arm 1D includes semiconductor switching element 4a and diode 4b.

Semiconductor switching element 5a is connected between low potential-side DC input terminal T2 and B-phase AC output terminal T11. Diode 5b is connected in anti-parallel to corresponding semiconductor switching element 5a. A B-phase lower arm 1E includes semiconductor switching element 5a and diode 5b.

Semiconductor switching element 6a is connected between low potential-side DC input terminal T2 and C-phase AC output terminal T12. Diode 6b is connected in anti-parallel to corresponding semiconductor switching element 6a. A C-phase lower arm 1F includes semiconductor switching element 6a and diode 6b.

Main electrodes on the low potential side of semiconductor switching elements 4a to 6a constituting lower arms 1D to 1F are commonly connected to emitter terminal T9. Accordingly, emitter terminal T9 is also electrically connected to low potential-side DC input terminal T2.

First inverter circuit I1 converts DC voltages input from DC input terminals T1, T2 into three-phase AC voltages according to control signals input to control terminals T3 to T8 of semiconductor switching elements 1a to 6a, and outputs the converted three-phase AC voltages from AC output terminals T10 to T12 to motor M1.

Similarly to the above, second inverter circuit I2 includes semiconductor switching elements 1c to 6c, diodes 1d to 6d individually corresponding to semiconductor switching elements 1c to 6c, a high potential-side DC input terminal T13, a low potential-side DC input terminal T14, respective control terminals T15 to T20 of semiconductor switching elements 1c to 6c, and AC output terminals T22 to T24.

Semiconductor switching element 1c is connected between high potential-side DC input terminal T13 and A-phase AC output terminal T22. Diode 1d is connected in anti-parallel (that is, in the reverse bias direction and in parallel) to corresponding semiconductor switching element 1c. An A-phase upper arm 2A includes semiconductor switching element 1c and diode 1d.

Semiconductor switching element 2c is connected between high potential-side DC input terminal T13 and B-phase AC output terminal T23. Diode 2d is connected in anti-parallel to corresponding semiconductor switching element 2c. A B-phase upper arm 2B includes semiconductor switching element 2c and diode 2d.

Semiconductor switching element 3c is connected between high potential-side DC input terminal T13 and C-phase AC output terminal T24. Diode 3d is connected in anti-parallel to corresponding semiconductor switching element 3c. A C-phase upper arm 2C includes semiconductor switching element 3c and diode 3d.

Semiconductor switching element 4c is connected between low potential-side DC input terminal T14 and A-phase AC output terminal T22. Diode 4d is connected in anti-parallel to corresponding semiconductor switching element 4c. An A-phase lower arm 2D includes semiconductor switching element 4c and diode 4d.

Semiconductor switching element 5c is connected between low potential-side DC input terminal T14 and B-phase AC output terminal T23. Diode 5d is connected in anti-parallel to corresponding semiconductor switching element 5c. A B-phase lower arm 2E includes semiconductor switching element 5c and diode 5d.

Semiconductor switching element 6c is connected between low potential-side DC input terminal T14 and C-phase AC output terminal T24. Diode 6d is connected in anti-parallel to corresponding semiconductor switching element 6c. A C-phase lower arm 2F includes semiconductor switching element 6c and diode 6d.

Main electrodes on the low potential side of semiconductor switching elements 4c to 6c constituting lower arms 2D to 2F are commonly connected to emitter terminal T21. Accordingly, emitter terminal T21 is also electrically connected to low potential-side DC input terminal T14.

First inverter circuit I2 converts DC voltages input from DC input terminals T13, T14 into three-phase AC voltages according to control signals input to control terminals T15 to T20 of semiconductor switching elements 1c to 6c, and outputs the converted three-phase AC voltages from AC output terminals T22 to T24 to motor M2.

In the present disclosure, in order to explicitly distinguish components of first inverter circuit I1 and components of second inverter circuit I2, sometimes semiconductor switching elements 1a to 6a are referred to as first semiconductor switching elements and semiconductor switching elements 1c to 6c are referred to as second semiconductor switching elements. Similarly, sometimes diodes 1b to 6b are referred to as first diodes and diodes 1d to 6d are referred to as second diodes. Sometimes control terminals T3 to T8 are referred to as first control terminals and control terminals T15 to T20 are referred to as second control terminals. Sometimes AC output terminals T10 to T12 are referred to as first AC output terminals and AC output terminals T22 to T24 are referred to as second AC output terminals.

In FIG. 1, semiconductor switching elements 1a to 6a, 1c to 6c are insulated gate bipolar transistors (IGBTs), but are not limited thereto. For example, semiconductor switching elements 1a to 6a, 1c to 6c may be bipolar power transistors or power metal-oxide-semiconductor field-effect transistors (MOSFET).

In FIG. 1, it is assumed that the rated output (also referred to as a motor capacity) of second motor M2 is larger than the rated output of first motor M1. For example, taking an air conditioner as an example, first motor M1 is a motor for an air cooling fan of a heat exchanger, and second motor M2 is a motor for a compressor. In this case, a current capacity of each of second semiconductor switching elements 1c to 6c is required to be larger than a current capacity of each of first semiconductor switching elements 1a to 6a depending on the difference in the rated output of the motor. Furthermore, the current capacity of each of second diodes 1d to 6d is required to be larger than the current capacity of each of first diodes 1b to 6b.

(Physical Configuration of Semiconductor Device SD1)

Figure 2:
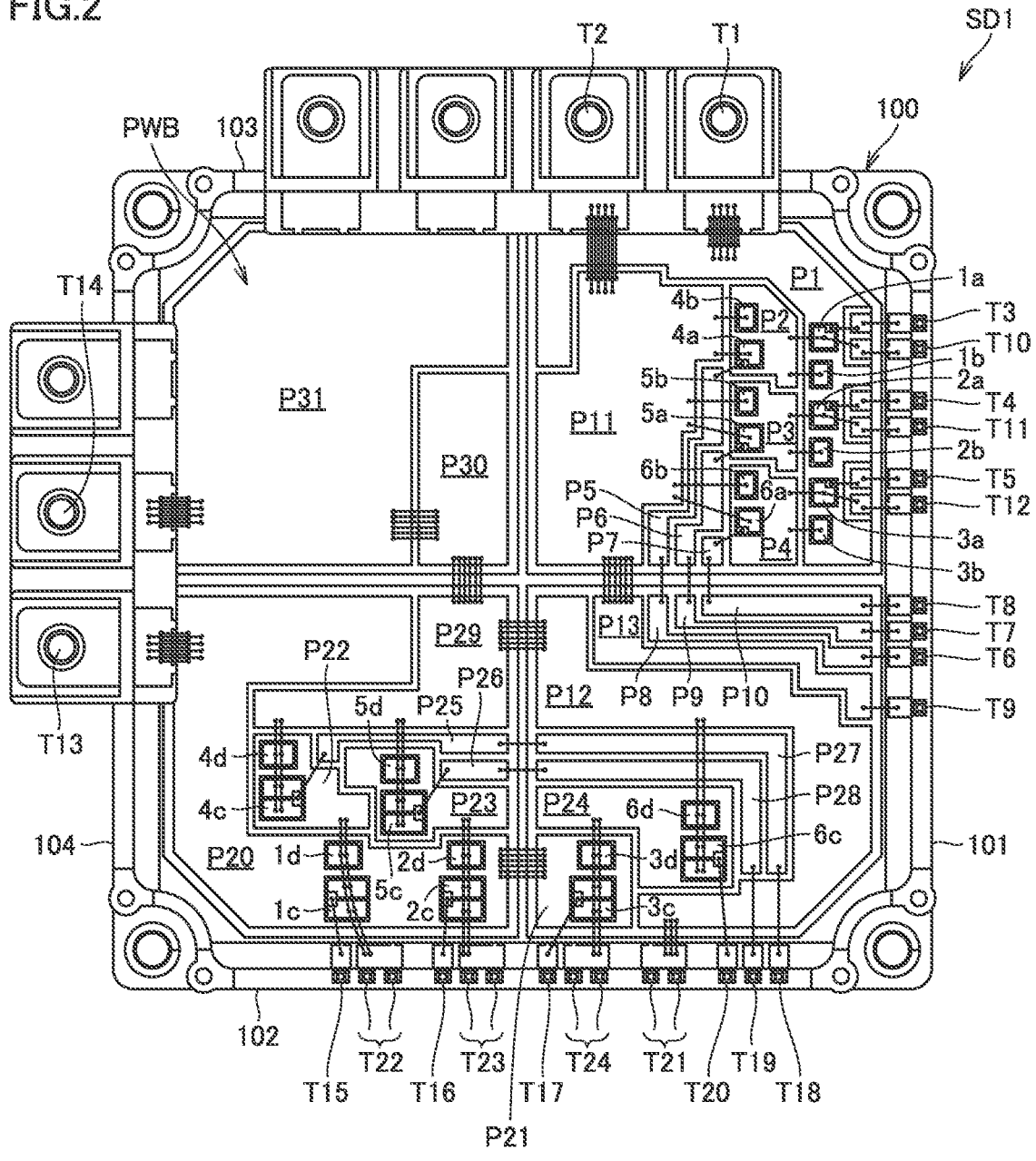
FIG. 2 is an internal plan view illustrating the semiconductor device of the first embodiment.

FIG. 2 is an internal plan view illustrating semiconductor device SD1 of the first embodiment. With reference to FIG. 2, semiconductor device SD1 includes a package 100 having a quadrangular shape in planar view and a printed wiring board PWB incorporated into package 100.

Switching element chips respectively corresponding to semiconductor switching elements 1a to 6a, 1c to 6c in FIG. 1 and diode chips respectively corresponding to diodes 1b to 6b, 1d to 6d in FIG. 1 are mounted on printed wiring board PWB. Taking the IGBT as an example, a front surface of each switching element chip corresponds to an emitter electrode and a gate electrode, and a back surface of each switching element chip corresponds to a collector electrode. In addition, the front surface of each diode chip corresponds to a cathode electrode, and the back surface of each diode chip corresponds to an anode electrode.

In the following description, for the sake of simplicity, switching element chips respectively corresponding to semiconductor switching elements 1a to 6a, 1c to 6c are referred to as switching element chips 1a to 6a, 1c to 6c. Diode chips respectively corresponding to diodes 1b to 6b, 1d to 6d are referred to as diode chips 1b to 6b, 1d to 6d. In addition, sometimes first switching element chips 1a to 6a, first diode chips 1b to 6b, second switching element chips 1c to 6c, and second diode chips 1d to 6d are described in order to explicitly distinguish the components of first inverter circuit I1 from the components of second inverter circuit I2.

As illustrated in FIG. 2, a chip area of each of second switching element chips 1c to 6c is larger than a chip area of each of first switching element chips 1a to 6a, and the former is twice or more larger than the latter. In addition, the chip area of each of second diode chips 1d to 6d is greater than the chip area of each of first diode chips 1b to 6b, and the former is twice or more the latter. Thus, the current capacity of each of second switching element chips 1c to 6c can be (twice or more) greater than the current capacity of each of first switching element chips 1a to 6a, and the current capacity of each of second diode chips 1d to 6d can be (twice or more) greater than the current capacity of each of first diode chips 1b to 6b. As a result, a configuration suitable for the case where the rated output of second motor M2 connected to second inverter circuit I2 is greater than the rated output of first motor M1 connected to first inverter circuit I1 can be achieved.

The various terminals in FIG. 1, namely, high potential-side DC input terminals T1, T13, low potential-side DC input terminals T2, T14, control terminals T3 to T8, T15 to T20, emitter terminals T9, T21, and AC output terminals T10 to T12, T22 to T24 are fixed on the peripheral edge of package 100 in planar view.

Specifically, control terminals T3 to T8, emitter terminal T9, and AC output terminals T10 to T12 constituting first inverter circuit I1 are disposed along a first side 101 of quadrangular package 100 in planar view. Accordingly, switching element chips 1a to 6a and diode chips 1b to 6b constituting first inverter circuit I1 are disposed in the vicinity of first side 101.

Control terminals T15 to T20, emitter terminal T21, and AC output terminals T22 to T24 constituting second inverter circuit I2 are disposed along a second side 102 adjacent to first side 101 of package 100 in planar view. Accordingly, switching element chips 1c to 6c and diode chips 1d to 6d constituting second inverter circuit I2 are disposed in the vicinity of second side 102.

High potential-side DC input terminal T1 and low potential-side DC input terminal T2 connected to first inverter circuit I1 are disposed along a third side 103 that is adjacent to first side 101 of package 100 and is opposite to second side 102.

High potential-side DC input terminal T13 and low potential-side DC input terminal T14 connected to second inverter circuit I2 are disposed on a fourth side 104 that is adjacent to second side 102 of package 100 and is opposite to first side 101.

Here, in the case of FIG. 1, two terminals are provided as each of AC output terminals T22 to T24 used for second inverter circuit I2. In this manner, the number of terminals for each phase in AC output terminals T22 to T24 used in second inverter circuit I2 (that is, the number of AC output terminals from which mutually equal AC voltages are output) is greater than the number of terminals for each phase in AC output terminals T10 to T12 used in first inverter circuit I1. With this configuration, heat generation due to energization at the AC output terminal of second inverter circuit I2 having the larger current capacity can be suppressed.

By disposing the terminals provided in semiconductor device SD1 as described above, space efficiency can be enhanced, and parasitic inductance can be reduced by minimizing a wiring length. In the following, with reference to FIG. 2, a connection relationship between various terminals, switching element chips, and diode chips, and printed wiring board PWB will be specifically described.

A-phase AC output terminal T10 is connected to the emitter electrode on the surface of switching element chip 1a through a bonding wire. The emitter electrode on the surface of switching element chip 1a is further connected to a pattern wiring P2 through a bonding wire. Control terminal T3 for semiconductor switching element 1a is connected to the gate electrode of switching element chip 1a through a bonding wire. The collector electrode on the back surface of switching element chip 1a is soldered to a pattern wiring P1, and thereby electrically connected to a pattern wiring P1. Pattern wiring P1 is connected to high potential-side DC input terminal T1 through a bonding wire.

Similarly, B-phase AC output terminal T11 is connected to the emitter electrode on the surface of switching element chip 2a through a bonding wire. The emitter electrode on the surface of switching element chip 2a is further connected to a pattern wiring P3 through a bonding wire. Control terminal T4 for semiconductor switching element 2a is connected to the gate electrode of switching element chip 2a through a bonding wire. The collector electrode on the back surface of switching element chip 2a is soldered to pattern wiring P1, and thereby electrically connected to pattern wiring P1.

Similarly, C-phase AC output terminal T12 is connected to the emitter electrode on the surface of switching element chip 3a through a bonding wire. The emitter electrode on the surface of switching element chip 3a is further connected to a pattern wiring P4 through a bonding wire. Control terminal T5 for semiconductor switching element 3a is connected to the gate electrode of switching element chip 3a through a bonding wire. The collector electrode on the back surface of switching element chip 3a is soldered to pattern wiring P1, and thereby electrically connected to pattern wiring P1.

The anode electrodes on the back surfaces of diode chips 1b to 3b are electrically connected to pattern wiring P1 by being all soldered to pattern wiring P1. The cathode electrodes on the surfaces of diode chips 1b to 3b are individually connected to pattern wirings P2 to P4 through bonding wires, respectively.

The collector electrodes on the back surfaces of switching element chips 4a to 6a are individually soldered to pattern wirings P2 to P4, respectively, and thereby individually electrically connected to pattern wirings P2 to P4, respectively. As described above, pattern wirings P2 to P4 are individually connected to AC output terminals T10 to T12 through the bonding wires, respectively. The emitter electrodes on the surfaces of switching element chips 4a to 6a are connected to a common pattern wiring P11 through bonding wires. Pattern wiring P11 is connected to low potential-side DC input terminal T2 through a bonding wire. Furthermore, pattern wiring P11 is connected to a pattern wiring P13 through a bonding wire, and pattern wiring P13 is connected to emitter terminal T9 through a bonding wire.

The gate electrode on the surface of switching element chip 4a is connected to pattern wiring P5 through a bonding wire, pattern wiring P5 is connected to a pattern wiring P8 through a bonding wire, and pattern wiring P8 is connected to control terminal T6 through a bonding wire. Similarly, the gate electrode on the surface of semiconductor switching element 5a is connected to a pattern wiring P6 through a bonding wire, pattern wiring P6 is connected to a pattern wiring P9 through a bonding wire, and pattern wiring P9 is connected to control terminal T7 through a bonding wire. Similarly, the gate electrode on the surface of semiconductor switching element 6a is connected to a pattern wiring P7 through a bonding wire, pattern wiring P7 is connected to a pattern wiring P10 through a bonding wire, and pattern wiring P10 is connected to control terminal T8 through a bonding wire.

The anode electrodes on the back surfaces of diode chips 4b to 6b are individually soldered to pattern wirings P2 to P4, respectively, and thereby individually electrically connected to pattern wirings P2 to P4, respectively. The cathode electrodes on the surfaces of diode chips 4b to 6b are connected to a common pattern wiring P11 through bonding wires.

From the above, it can be seen that the connection relationship of first inverter circuit I1 in FIG. 1 can be realized in the physical configuration diagram in FIG. 2. In the following, we will describe that the connection relationship of second inverter circuit I2 in FIG. 1 can be realized in the physical configuration diagram in FIG. 2.

A-phase AC output terminal T22 is connected to the emitter electrode on the surface of switching element chip 1c through a bonding wire. The emitter electrode on the surface of switching element chip 1c is further connected to a pattern wiring P22 through a bonding wire. Control terminal T15 for semiconductor switching element 1c is connected to the gate electrode of switching element chip 1c through a bonding wire. The collector electrode on the back surface of switching element chip 1c is soldered to a pattern wiring P20, and thereby electrically connected to pattern wiring P20. Pattern wiring P20 is connected to high potential-side DC input terminal T13 through a bonding wire.

Similarly, B-phase AC output terminal T23 is connected to the emitter electrode on the surface of switching element chip 2c through a bonding wire. The emitter electrode on the surface of switching element chip 2c is further connected to a pattern wiring P23 through a bonding wire. Control terminal T16 for semiconductor switching element 2c is connected to the gate electrode of switching element chip 2c through a bonding wire. The collector electrode on the back surface of switching element chip 2c is soldered to pattern wiring P20, and thereby electrically connected to pattern wiring P20.

Similarly, C-phase AC output terminal T24 is connected to the emitter electrode on the surface of switching element chip 3c through a bonding wire. The emitter electrode on the surface of switching element chip 3c is further connected to a pattern wiring P24 through a bonding wire. Control terminal T17 for semiconductor switching element 3c is connected to the gate electrode of switching element chip 3c through a bonding wire. The collector electrode on the back surface of switching element chip 3c is soldered to a pattern wiring P21, and thereby electrically connected to pattern wiring P21. Pattern wiring P21 is connected to pattern wiring P20 through a bonding wire, and pattern wiring P20 is connected to high potential-side DC input terminal T13 through a bonding wire.

The anode electrodes on the back surfaces of diode chips 1d and 2d are electrically connected to pattern wiring P20, by being all soldered to pattern wiring P20. The anode electrodes on the back surfaces of diode chip 3d are electrically connected to pattern wiring P21, by being all soldered to pattern wiring P21. The cathode electrodes on the surfaces of diode chips 1d to 3d are individually connected to pattern wirings P22 to P24 through bonding wires, respectively.

The collector electrodes on the back surfaces of switching element chips 4c to 6c are individually soldered to pattern wirings P22 to P24, respectively, and thereby individually electrically connected to pattern wirings P22 to P24, respectively. As described above, pattern wirings P22 to P24 are individually connected to AC output terminals T22 to T24 through the bonding wires, respectively.

The emitter electrodes on the surfaces of switching element chips 4c, 5c are connected to a common pattern wiring P29 through bonding wires. Pattern wiring P29 is connected to a pattern wiring P30 through a bonding wire, pattern wiring P30 is connected to a pattern wiring P31 through a bonding wire, and pattern wiring P31 is connected to low potential-side DC input terminal T14 through a bonding wire. Furthermore, pattern wiring P29 is connected to pattern wiring P12 through a bonding wire, and pattern wiring P12 is connected to emitter terminal T21 through a bonding wire. The emitter electrode on the surface of switching element chip 6c is connected to pattern wiring P12 through a bonding wire. As described above, pattern wiring P12 is electrically connected to DC input terminal T14 and emitter terminal T21.

The gate electrode on the surface of switching element chip 4c is connected to a pattern wiring P25 through a bonding wire, pattern wiring P25 is connected to a pattern wiring P27 through a bonding wire, and pattern wiring P27 is connected to control terminal T18 through a bonding wire. Similarly, the gate electrode on the surface of semiconductor switching element 5c is connected to a pattern wiring P26 through a bonding wire, pattern wiring P26 is connected to a pattern wiring P28 through a bonding wire, and pattern wiring P28 is connected to control terminal T19 through a bonding wire. The gate electrode on the surface of semiconductor switching element 6c is connected to control terminal T20 through a bonding wire.

The anode electrodes on the back surfaces of diode chips 4d to 6d are individually soldered to pattern wirings P22 to P24, respectively, and thereby individually electrically connected to pattern wirings P22 to P24, respectively. The cathode electrodes on the surfaces of diode chips 4d and 5d are connected to a common pattern wiring P29 through a bonding wire. The cathode electrode on the surface of diode chip 6d is connected to pattern wiring P12 through a bonding wire. As described above, pattern wirings P29, P12 are electrically connected to low potential-side DC input terminal T14.

As described above, it can be seen that the connection relationship of second inverter circuit I2 in FIG. 1 can be realized in the physical configuration diagram in FIG. 2.

Effect of First Embodiment

As described above, according to semiconductor device SD1 of the first embodiment, one semiconductor device includes two inverter circuits I1, I2 having different specifications, so that motors M1, M2 having different rated outputs can be driven by one semiconductor device SD1. There exists conventionally a semiconductor device on which one inverter circuit capable of driving one motor is mounted or a semiconductor device capable of driving one motor and one generator. However, a semiconductor device that drives two different types of motors has not been developed so far.

Specifically, the air conditioner will be described as an example. Because the motor mounted on the compressor and the motor driving the air cooling fan are greatly different in motor output, two semiconductor devices having current capacities different from each other are required to be mounted. In the case of utilizing conventional semiconductor devices, a plurality of semiconductor devices on each of which a single inverter substrate is mounted are required to be prepared due to restrictions on a package size and the like. For this reason, coolers corresponding to the respective semiconductor devices are required to be prepared. As a result, there arises a problem that it is necessary to secure another space and add cost for a peripheral device in addition to the space and cost for the semiconductor device.

According to the semiconductor device of the first embodiment, there is provided a semiconductor device on which a plurality of inverter circuits having different current capacities are mounted in order to drive a plurality of motors having different outputs. Specifically, the area of the semiconductor chip is made different for each inverter circuit. With such a characteristic, space saving, weight reduction, cost reduction, and improvement in cooling efficiency can be realized in the entire system including the semiconductor device.

As illustrated in FIG. 2, the number of terminals for each phase in AC output terminals T22 to T24 used in second inverter circuit I2 (that is, the number of AC output terminals from which mutually equal AC voltages are output) is greater than the number of terminals for each phase in AC output terminals T10 to T12 used in first inverter circuit I1. Thus, the heat generation due to the energization at the AC output terminal of second inverter circuit I2 having the large current capacity can be suppressed.

In addition, a large number of terminals of the semiconductor device are grouped by function and arranged on four sides such that a user can easily perform external wiring. Thus, the external wiring for supplying the gate signals to first inverter circuit I1 and second inverter circuit I2 can be routed without crossing each other, and malfunction due to a noise from other signal lines can be prevented. In addition, by disposing the terminals through each of which a large current flows and the terminals through each of which a large current does not flow on different sides of quadrangular package 100 in planar view, the temperature rise of the entire package can be suppressed.

Modification of First Embodiment

Although the case of the three-phase AC has been described above, a similar action and effect are produced also in the case of the single-phase AC. Specifically, in the case of the single-phase AC, upper arms 1C, 2C, lower arms 1F, 2F, and AC output terminals T12, T24 are excluded in FIG. 1.

Second Embodiment (Circuit Configuration of Semiconductor Device SD2)

Figure 3:
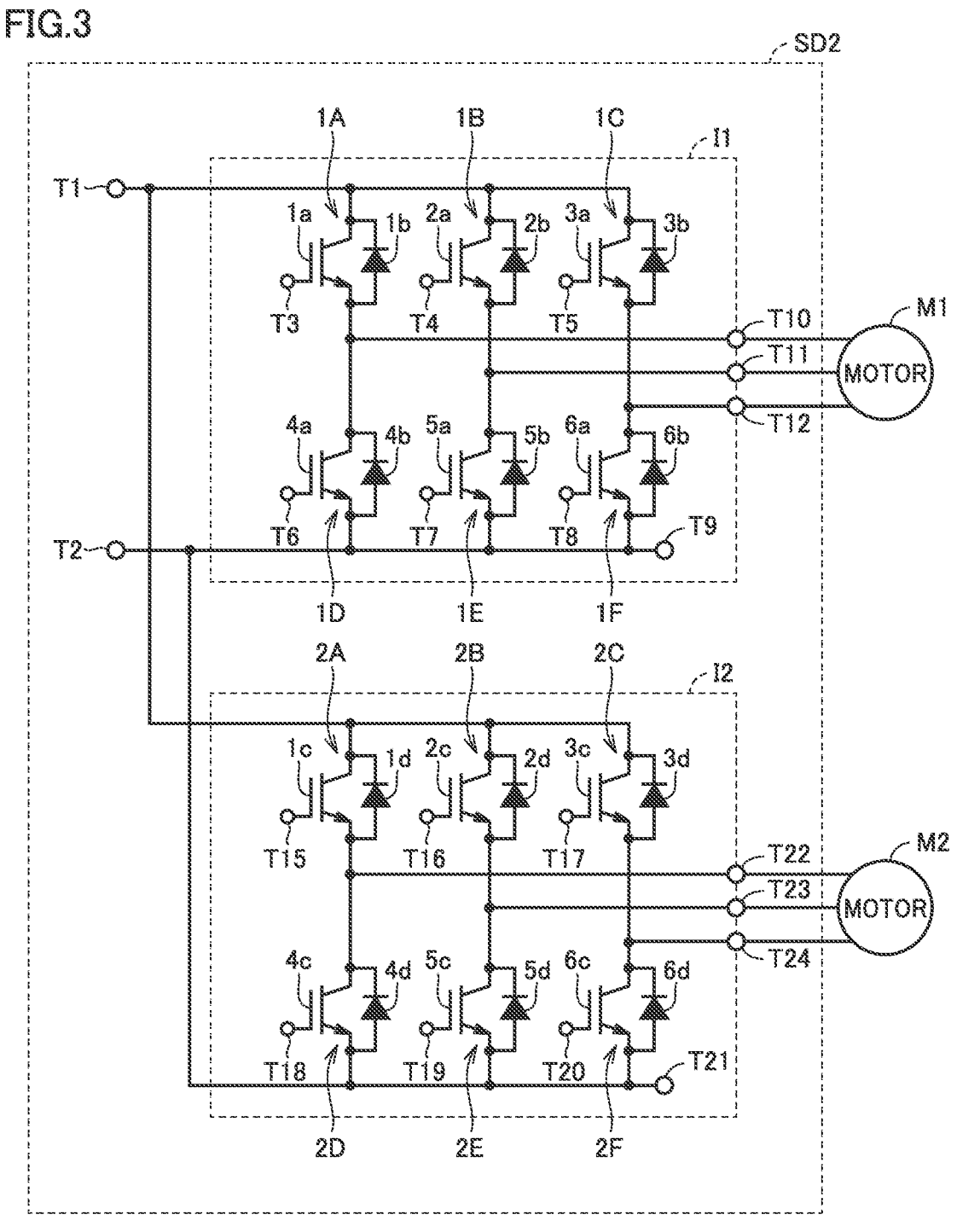
FIG. 3 is a circuit diagram illustrating a semiconductor device according to a second embodiment.

FIG. 3 is a circuit diagram illustrating a semiconductor device SD2 according to a second embodiment. Semiconductor device SD2 in FIG. 3 is different from semiconductor device SD1 in FIG. 1 in that high-potential-side DC input terminal T13 and low-potential-side DC input terminal T14 are not provided, the high-potential-side DC wirings of first and second inverter circuits I1, I2 are connected to common high-potential-side DC input terminal T1, and the low-potential-side DC wirings of first and second inverter circuits I1, I2 are connected to common low-potential-side DC input terminal T2.

Because other points of semiconductor device SD2 in FIG. 3 are similar to those of semiconductor device SD1 in FIG. 1, the same or corresponding portions as those in FIG. 1 are denoted by the same reference characters, and the description thereof will not be repeated.

(Physical Configuration of Semiconductor Device SD2)

Figure 4:
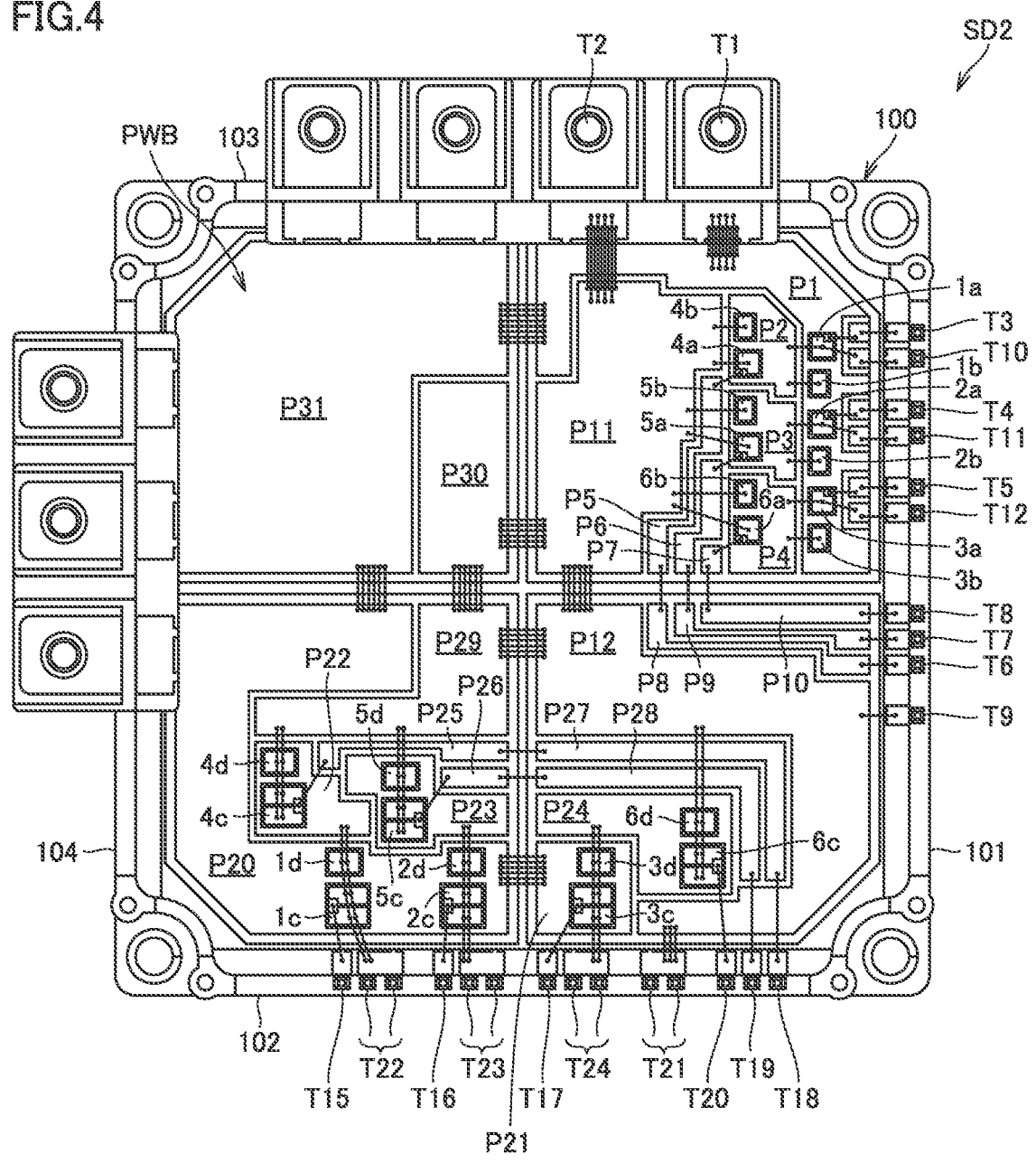
FIG. 4 is an internal plan view illustrating the semiconductor device of the second embodiment.

FIG. 4 is an internal plan view of semiconductor device SD2 of the second embodiment. The physical configuration of semiconductor device SD2 in FIG. 4 is different from the physical configuration of semiconductor device SD1 in FIG. 2 in the following points.

Specifically, in the case of FIG. 4, pattern wiring P12 and pattern wiring P13 are made common as one pattern wiring P12. Furthermore, pattern wiring P30 is not electrically connected to pattern wiring P31 but is electrically connected to pattern wiring P11. Furthermore, pattern wiring P31 is not connected to pattern wiring P30 but is connected to pattern wirings P1 and P20 through bonding wires.

From the above, pattern wirings P20, P21, P31, P1 are connected to high-potential-side DC input terminal T1 as high-potential-side DC wirings. Pattern wirings P12, P29, P30, P11 are connected to low-potential-side DC input terminal T2 as low-potential-side DC wirings. Because other points in FIG. 4 are the same as those in FIG. 2, the description thereof will not be repeated.

Effect of Second Embodiment

According to semiconductor device SD2 of the second embodiment, the same effects as those of the first embodiment are obtained, and the following effects are further obtained.

Specifically, in semiconductor device SD2 of the second embodiment, the high-potential-side DC wirings of first and second inverter circuits I1, I2 are connected to common high-potential-side DC input terminal T1, and the low-potential-side DC wirings of first and second inverter circuits I1, I2 are connected to common low-potential-side DC input terminal T2. Thus, the inductance of the main circuit of semiconductor device SD2 can be reduced, so that the surge voltage generated during the switching operation of the semiconductor switching element can be reduced.

Third Embodiment (Circuit Configuration of Semiconductor Device SD3)

Figure 5:
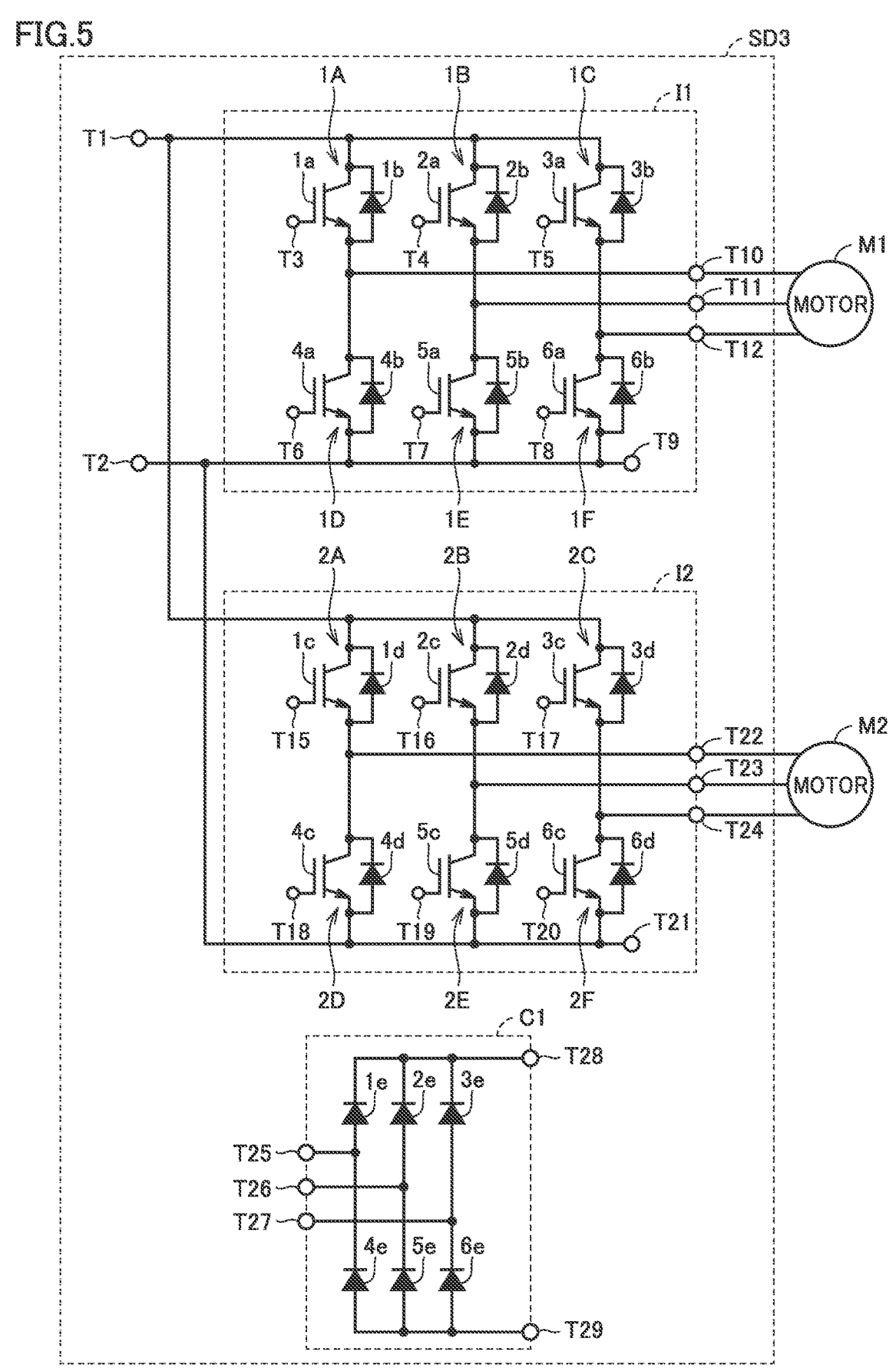
FIG. 5 is a circuit diagram illustrating a semiconductor device according to a third embodiment.

FIG. 5 is a circuit diagram illustrating a semiconductor device SD3 according to a third embodiment. Semiconductor device SD3 in FIG. 5 is different from semiconductor device SD1 in FIG. 3 in that semiconductor device SD3 further includes a full-wave rectifier circuit Cl, AC input terminals T25 to T27, and DC output terminals T28, T29.

Specifically, full-wave rectifier circuit Cl includes diodes 1e to 6e. The cathode of diode 1e is connected to DC output terminal T28 on the high potential side, and the anode of diode 1e is connected to AC input terminal T25. The cathode of diode 2e is connected to DC output terminal T28 on the high potential side, and the anode of diode 2e is connected to AC input terminal T26. The cathode of diode 3e is connected to DC output terminal T28 on the high potential side, and the anode of diode 3e is connected to AC input terminal T27. The cathode of diode 4e is connected to AC input terminal T25, and the anode of diode 4e is connected to DC output terminal T29 on the low potential side. The cathode of diode 5e is connected to AC input terminal T26, and the anode of diode 4e is connected to DC output terminal T29 on the low potential side. The cathode of diode 6e is connected to AC input terminal T27, and the anode of diode 6e is connected to DC output terminal T29 on the low potential side.

Because other points in FIG. 5 are the same as those in FIG. 3, the same or corresponding portions are denoted by the same reference characters, and the description thereof will not be repeated.

(Physical Configuration of Semiconductor Device SD3)

Figure 6:
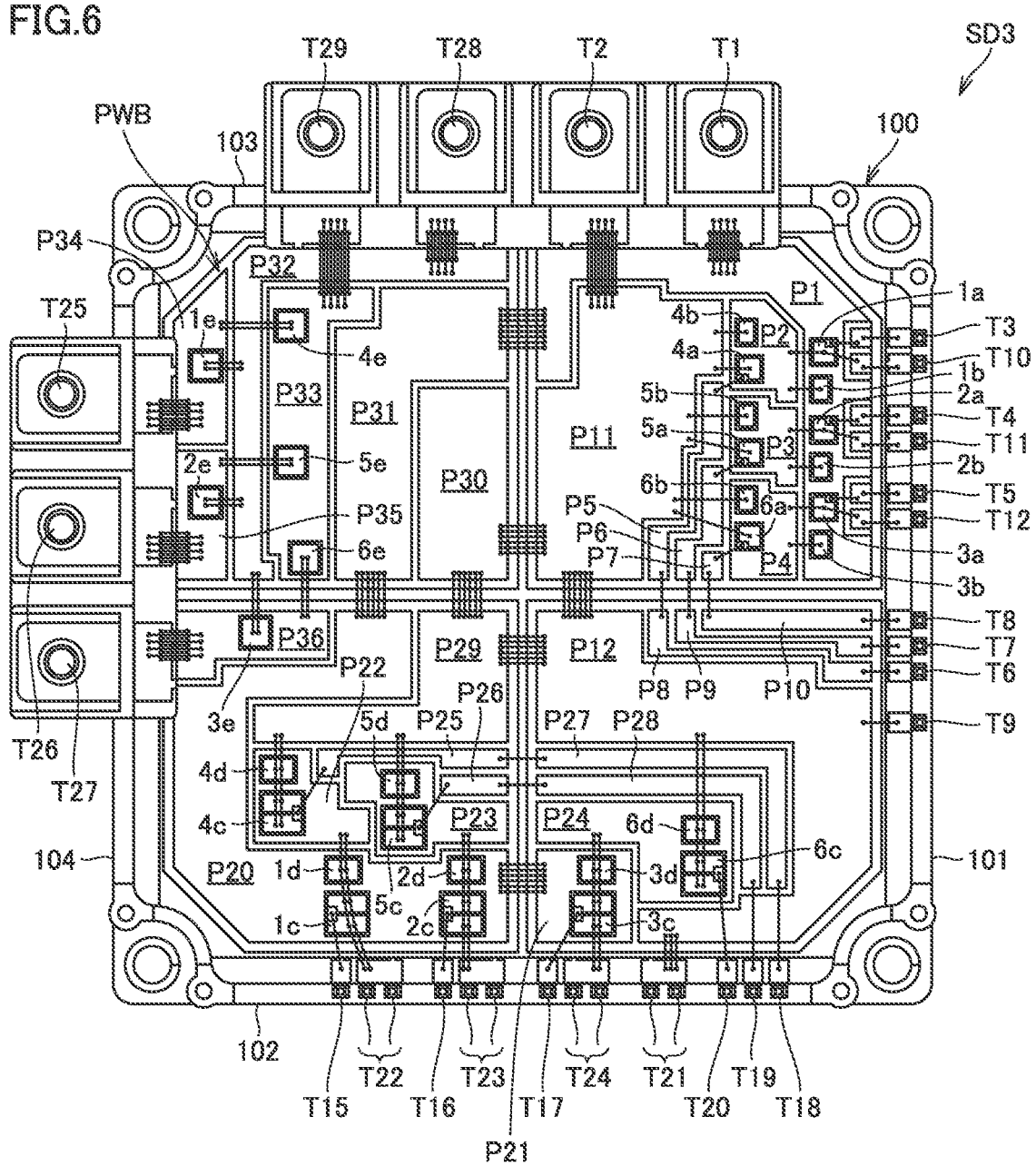
FIG. 6 is an internal plan view illustrating the semiconductor device of the third embodiment.

FIG. 6 is an internal plan view illustrating semiconductor device SD3 of the third embodiment. The physical configuration of semiconductor device SD3 in FIG. 6 is different from the physical configuration of semiconductor device SD2 in FIG. 4 in the following points. In the following description, diode chips respectively corresponding to diodes 1e to 6e are simply referred to as diode chips 1e to 6e.

Specifically, in the case of FIG. 6, pattern wiring P20 in FIG. 4 is separated into pattern wiring P20 and a pattern wiring P36. A pattern wiring P31 in FIG. 4 is separated into pattern wirings P31 to P35.

AC input terminals T25 to T27 are fixed to fourth side 104 of quadrangular package 100 in planar view. AC input terminal T25 is connected to pattern wiring P34 through a bonding wire. AC input terminal T26 is connected to pattern wiring P35 through a bonding wire. AC input terminal T27 is connected to pattern wiring P36 through a bonding wire. DC output terminal T28 is connected to pattern wiring P32 through a bonding wire. DC output terminal T29 is connected to pattern wiring P33 through a bonding wire.

The anode on the back surface of diode chip 1e is soldered to pattern wiring P34, and thereby electrically connected to pattern wiring P34. The cathode on the surface of diode chip 1e is connected to pattern wiring P32 through a bonding wire. Similarly, the anode on the back surface of diode chip 2e is soldered to pattern wiring P35, and thereby electrically connected to pattern wiring P35. The cathode on the surface of diode chip 2e is connected to pattern wiring P32 through a bonding wire. Similarly, the anode on the back surface of diode chip 3e is soldered to pattern wiring P36, and thereby electrically connected to pattern wiring P36. The cathode on the surface of diode chip 3e is connected to pattern wiring P32 through a bonding wire.

The anodes on the back surfaces of diode chips 4e to 6e are electrically connected to pattern wiring P33, by being all soldered to pattern wiring P33. The cathodes on the surfaces of diode chips 4e to 6e are individually connected to pattern wirings P34 to P36 through bonding wires, respectively.

From the above, it can be seen that the connection relationship of full-wave rectifier circuit Cl in FIG. 5 is realized in the physical configuration diagram in FIG. 6. Because other configurations in FIG. 6 are similar to those in FIG. 4, the same or corresponding parts are denoted by the same reference characters, and the description thereof will not be repeated.

Effect of Third Embodiment

As described above, according to semiconductor device SD3 of the third embodiment, full-wave rectifier circuit Cl is further mounted on the semiconductor device on which first and second inverter circuits I1, I2 are mounted. Thus, in addition to the effects of the first and second embodiments, the number of coolers can be reduced by integrating semiconductor chips as heat generating components into one semiconductor device, and the entire system including the semiconductor device can be downsized.

In addition, similarly to the case of the first embodiment, also in the third embodiment, a large number of terminals of the semiconductor device are grouped by function and arranged on four sides such that a user can easily perform external wiring. Thus, the external wiring for supplying the gate voltages to first inverter circuit I1 and second inverter circuit I2 can be routed without crossing each other, and malfunction due to a noise from other signal lines can be prevented. In addition, by disposing the terminals through each of which a large current flows and the terminals through each of which a large current does not flow on different sides of quadrangular package 100 in planar view, the temperature rise of the entire package can be suppressed.

Modification of Third Embodiment

Although the case of the three-phase AC has been described above, a similar action and effect are produced also in the case of the single-phase AC. Specifically, in the case of the single-phase AC, upper arms 1C, 2C, lower arms 1F, 2F, AC output terminals T12, T24, AC input terminal T27, and diodes 3e, 6e are excluded in FIG. 5.

Although the embodiments of the present invention have been described, it should be understood that the embodiments disclosed herein are illustrative and non-restrictive in every respect. The scope of the present invention is defined by the terms of the claims, and is intended to include any modifications within the scope and meaning equivalent to the terms of the claims.

What is claimed is:

1. A semiconductor device comprising:

a package;

a printed wiring board incorporated into the package;

a plurality of first switching element chips mounted on the printed wiring board to constitute a first inverter circuit;

a plurality of first diode chips mounted on the printed wiring board and individually corresponding to the plurality of first switching element chips, each of the plurality of first diode chips being electrically connected in anti-parallel to a corresponding one of the plurality of first switching element chips;

a plurality of second switching element chips mounted on the printed wiring board to constitute a second inverter circuit; and a plurality of second diode chips mounted on the printed wiring board and individually corresponding to the plurality of second switching element chips, each of the plurality of second diode chips being electrically connected in anti-parallel to a corresponding one of the second switching element chips, wherein a current capacity of each of the plurality of second switching element chips is greater than a current capacity of each of the plurality of first switching element chips, and a current capacity of each of the plurality of second diode chips is greater than a current capacity of each of the plurality of first diode chips, the semiconductor device further comprising:

a high potential-side DC input terminal fixed to the package and commonly used for the first inverter circuit and the second inverter circuit;

a low potential-side DC input terminal fixed to the package and commonly used for the first inverter circuit and the second inverter circuit;

a plurality of first AC output terminals fixed to the package to output a single-phase or multi-phase AC voltage from the first inverter circuit;

a plurality of second AC output terminals fixed to the package to output a single-phase or multi-phase AC voltage from the second inverter circuit;

a plurality of first control terminals fixed to the package and individually connected to control electrodes of the plurality of first switching element chips; and a plurality of second control terminals fixed to the package and individually connected to control electrodes of the plurality of second switching element chips, wherein the package has a quadrangular shape in planar view, the plurality of first AC output terminals and the plurality of first control terminals are disposed along a first side of the quadrangular shape in planar view, the plurality of second AC output terminals and the plurality of second control terminals are disposed along a second side adjacent to the first side of the quadrangular shape in planar view, and the high potential-side DC input terminal and the low potential-side DC input terminal are disposed along a third side of the quadrangular shape opposite to the second side.

2. The semiconductor device according to claim 1, wherein a chip area of each of the plurality of second switching element chips is twice as large or more than a chip area of each of the plurality of first switching element chips, and a chip area of each of the plurality of second diode chips is twice as large or more than a chip area of each of the plurality of first diode chips.

3. The semiconductor device according to claim 1, wherein a number of terminals for outputting mutually equal AC voltages provided in the second AC output terminals is greater than a number of terminals for outputting mutually equal AC voltages provided in the first AC output terminals.

4. The semiconductor device according to claim 1, further comprising:

a plurality of third diode chips mounted on the printed wiring board to constitute a full-wave rectifier circuit;

a plurality of AC input terminals fixed to the package to input an AC voltage to the full-wave rectifier circuit; and a high potential-side DC output terminal and a low potential-side DC output terminal fixed to the package to output a DC voltage from the full-wave rectifier circuit, wherein the high potential-side DC output terminal and the low potential-side DC output terminal are disposed along the third side, and the plurality of AC input terminals are disposed along a fourth side of the quadrangular shape opposite to the first side.

5. The semiconductor device according to claim 1, further comprising a plurality of third diode chips mounted on the printed wiring board and constitute a full-wave rectifier circuit.

* * * * *